United States Patent
Metz, Jr. et al.

(10) Patent No.: US 8,074,179 B2
(45) Date of Patent: Dec. 6, 2011

(54) USER INTERFACE INCLUDING QUESTION VERIFICATION INDICATORS

(75) Inventors: Walter C. Metz, Jr., Raleigh, NC (US); Hoyt C. Simmons, Apex, NC (US); Susan E. Swanson, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 12/210,425

(22) Filed: Sep. 15, 2008

(65) Prior Publication Data

US 2010/0070892 A1 Mar. 18, 2010

(51) Int. Cl.
*G06F 3/048* (2006.01)
(52) U.S. Cl. ......... 715/772; 715/769; 715/224; 715/226
(58) Field of Classification Search .................. 715/221, 715/224, 226, 204, 708, 764, 780, 744–747, 715/769, 772
See application file for complete search history.

(56) References Cited

U.S. PATENT DOCUMENTS

| | | |
|---|---|---|
| 2002/0138462 A1* | 9/2002 | Ricketts ........................... 707/1 |
| 2003/0154406 A1* | 8/2003 | Honarvar et al. ............. 713/201 |
| 2004/0059618 A1* | 3/2004 | Ford et al. .......................... 705/8 |
| 2005/0198563 A1* | 9/2005 | Kristjansson ................. 715/507 |
| 2006/0293928 A1* | 12/2006 | Schumacher et al. ............ 705/4 |
| 2007/0143169 A1* | 6/2007 | Grant et al. ....................... 705/9 |

* cited by examiner

*Primary Examiner* — Tuyetlien Tran
*Assistant Examiner* — Abimbola Ayeni
(74) *Attorney, Agent, or Firm* — Cantor Colburn LLP; Randall Bluestone

(57) ABSTRACT

A method of displaying non-textual indication of question verification status in a user interface, the user interface including a plurality of questions associated there-with, includes receiving an answer to at least one question of the plurality of questions, associating a non-textual indication of the verification status of the answer, and displaying the non-textual indication of the at least one question.

3 Claims, 7 Drawing Sheets

USER INTERFACE INCLUDING QUESTION VERIFICATION INDICATORS

BACKGROUND

Embodiments of the present invention are generally directed to user interfaces, and more particularly, to user interfaces including question verification indicators.

A common computer-program user interface involves having the user answer a set of questions that are structured hierarchically. Examples are wizards, questionnaires, and configurators. In these applications, the answer to a question may trigger the requirement that the user answer a list of subquestions, some of which may have answers that trigger another list of subquestions, and so on. Typically, for some questions the user is very confident in his or her answer; for other questions, the user inputs a "preliminary" answer, pending additional research to "verify" the answer. Generally, there are no means for identifying, locating, and reporting questions that are unanswered or questions that are answered and unverified

BRIEF DESCRIPTION

An embodiment of the invention includes a method of displaying non-textual indication of question verification status in a user interface, the user interface including a plurality of questions associated there-with. The method includes receiving an answer to at least one question of the plurality of questions and associating a non-textual indication of the verification status of the answer with the at least one question. According to the method, the associating includes interpreting a verification status of the answer, the interpreting including providing a visual selection aid to retrieve verification from a user of the user interface. Furthermore, the non-textual indication is a first form of non-textual indication if the answer is null, the non-textual indication is a second form of non-textual indication if the answer is a verified answer, and the non-textual indication is a third form of non-textual indication if the answer is not a verified answer. The method further includes displaying the non-textual indication of the at least one question, the non-textual indication being displayed in a portion of the user interface being associated with the at least one question.

BRIEF DESCRIPTION OF THE SEVERAL VIEWS OF THE DRAWINGS

These and other features, aspects, and advantages of the present invention will become better understood as the following detailed description is read with reference to the accompanying drawings in which like reference numerals represent like elements throughout the drawings, wherein.

DETAILED DESCRIPTION

Figure 1:
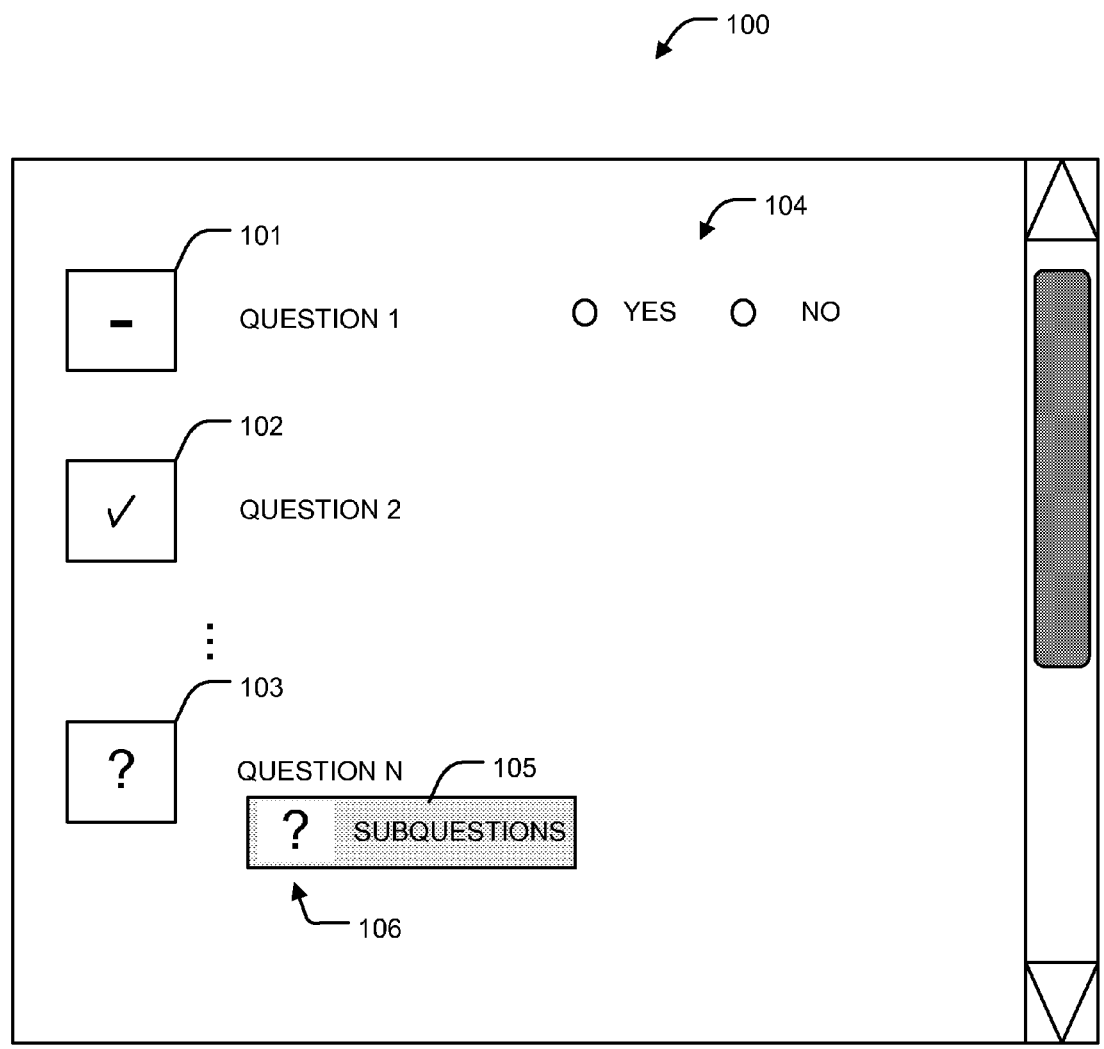
FIG. 1 illustrates a user interface, according to an example embodiment.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

According to example embodiments, a solution is provided which significantly increases the intelligibility of multiple answers within a user interface. This increase in intelligibility indicates which answered questions require verification and track which section of the question hierarchy contains unanswered and/or unverified questions. Thus example embodiments provide ease of locating unanswered and unverified questions and changing their verification state.

An example embodiment of the invention includes a method of displaying non-textual indication of question verification status in a user interface, the user interface including a plurality of questions associated there-with. The method includes receiving an answer to at least one question of the plurality of questions and associating a non-textual indication of the verification status of the answer with the at least one question. According to the method, the associating includes interpreting a verification status of the answer, the interpreting including providing a visual selection aid to retrieve verification from a user of the user interface. Furthermore, the non-textual indication is a first form of non-textual indication if the answer is null, the non-textual indication is a second form of non-textual indication if the answer is a verified answer, and the non-textual indication is a third form of non-textual indication if the answer is not a verified answer. The method further includes displaying the non-textual indication of the at least one question, the non-textual indication being displayed in a portion of the user interface being associated with the at least one question.

An example embodiment of the invention also includes a method of displaying a non-textual indication of subquestion verification status in a user interface. A plurality of questions may have a group of questions, one or more of which has subquestions, and any question in the group of subquestions may have a group of subquestions to a hierarchy of any depth. For any question that has a group of subquestions, the method further includes associating a non-textual indication with a composite verification status of the answers to all subquestions below the question in the hierarchy. The non-textual indication is a first form of non-textual indication if all the subquestions in the hierarchy have a null answer, the non-textual indication is a second form of non-textual indication if all the subquestions in the hierarchy are answered but least one question has an unverified answer, and the non-textual indication is a third form of non-textual indication if all the subquestions in the hierarchy are answered and verified. The method further includes displaying the non-textual indication on any question that has subquestions, the non-textual indication being displayed in a portion of the user interface being associated with the question that has subquestions.

An example embodiment of the invention also includes a method of displaying a non-textual indication of question category verification status in a user interface. A question category contains a group of questions one or more of which may contain subquestions which may also contain one more subquestions to any depth. The method further includes associating a non-textual indication with a composite verification status of the answers to all questions in the question hierarchy that are included in the question category. The non-textual indication is a first form of non-textual indication if all the questions in the hierarchy have a null answer, the non-textual indication is a second form of non-textual indication if all the questions in the hierarchy are answered but least one question has an unverified answer, and the non-textual indication is a third form of non-textual indication if all the questions in the hierarchy are answered and verified. The method further includes displaying the non-textual indication beside the question category in a navigation object in the user interface.

Hereinafter, example embodiments of the present invention will be described in detail with reference to the figures. Turning to FIG. 1, a user interface 100 is illustrated. The user interface includes a plurality of questions (1-N). Each of the questions may be associated with a non-textual indication (101, 102, and 103) of a verification status of an answer to the question. For example, a symbol on the indicator portions 101-103 indicates that the question is in one of at least the following states: (1) unanswered, (2) answered and verified, or (3) answered and unverified. The state indicators of the questions are propagated throughout the question hierarchy of the user interface so the user can easily locate unanswered and answered but not verified questions.

For example, the indicator portions 101-103 may be embodied as indicator buttons of the user interface 100. Therefore, the indicator portions 101-103 may be visual aids for user input of the verification status of the questions. Indicator buttons 102 and 103 may be toggled to change their verification state. For example, clicking a verification button with the check-mark symbol will change the question state from answered and verified to answered and unverified. Clicking a verification button with the question-mark symbol will change the question state from answered and unverified to answered and verified. The flow of verification alteration may be reversed or used in any other suitable order.

According to one example embodiment, a "dash" symbol indicates a question is unanswered (see 101), a "check mark" symbol indicates a question is answered and verified (see 102), and a "question mark" symbol indicates a question is answered but unverified (see 103).

Each question may have a plurality of forms of answer transmission. For example, answers to questions may be obtained using radio buttons (for a multiple-choice and yes/no questions) or using numerical fields (see 104). Furthermore, text blocks, pull-down menus, or any other suitable form of question answering means may be used. It is further noted that according to example embodiments, "subquestion" buttons may be included for any suitable question (see 105).

Figure 2:
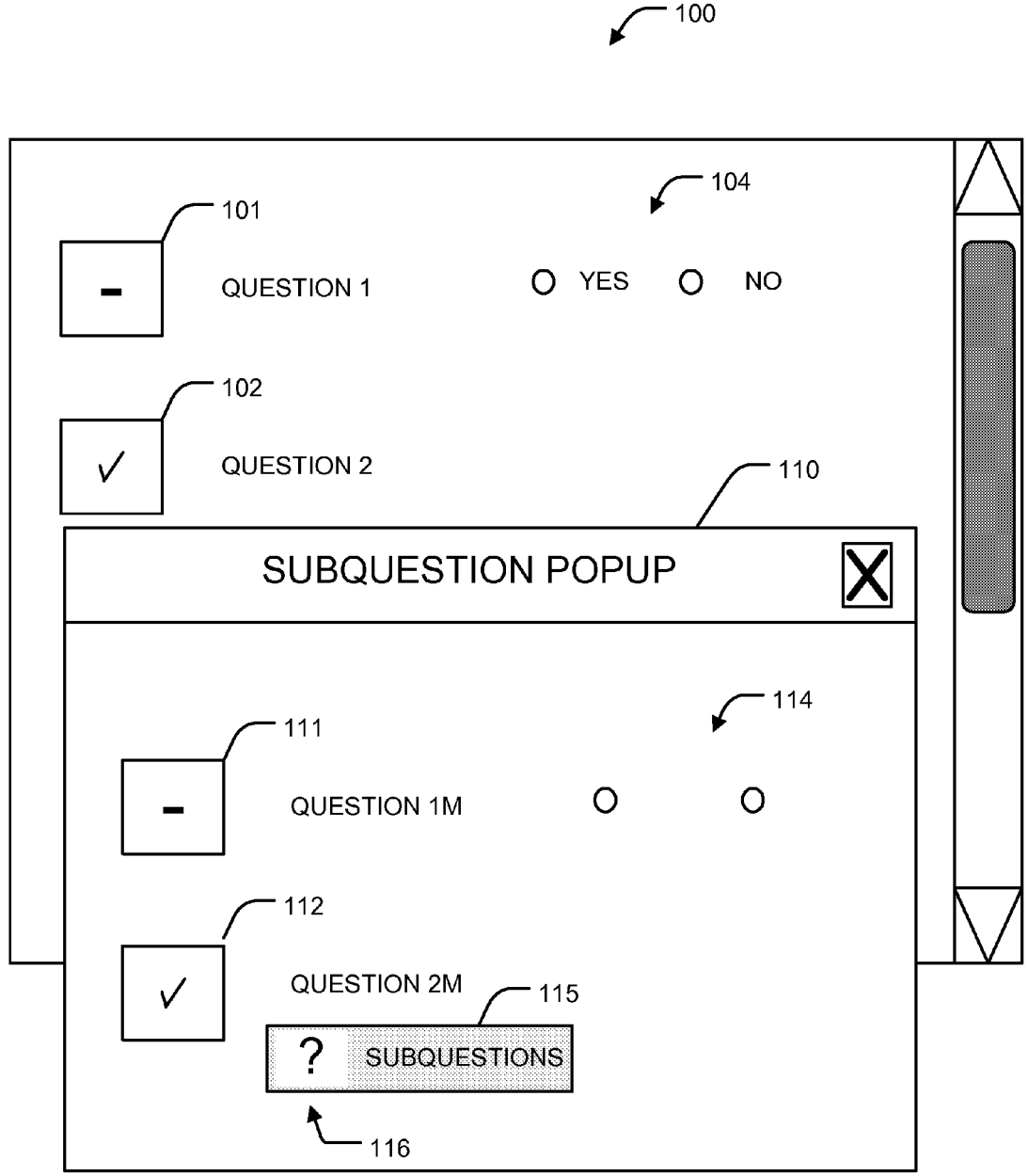
FIG. 2 illustrates a user interface, according to an example embodiment.

Accordingly, clicking a question's subquestion button opens a subquestion popup dialog containing a list of questions, any of which may also have a subquestion button. Turning to FIG. 2, a user interface employing a "subquestion popup dialog" is illustrated. The user interface includes a subquestion popup dialog 110. The subquestion popup dialog 110 includes one or more subquestions (111, 112) associated with a parent question initiating the subquestion popup dialog 110. The subquestion popup dialog 110 further includes a subquestion button 115 to initiate further subquestion popup dialogs. According to an example embodiment, questions and their subquestions may be organized according to a hierarchy governing the questions of the user interface.

A subquestion button may also display somewhat similar non-textual indicators as described above with regard to questions 1-N of FIG. 1 (e.g., see 106 and 116). However, the subquestion non-textual indicators have a different meaning: a "dash" indicates that one or more question in the hierarchy of subquestions reachable by clicking the subquestion button is unanswered; a "check-mark" indicates that all questions in the subquestion hierarchy are answered and verified; and a "question-mark" indicates that all questions in the subquestion hierarchy are answered but one or more of the questions remain unverified.

Furthermore, the verification status of all questions/subquestions may be propagated to a navigation tree of question categories that contain visual indicators with the same symbols as those on the subquestion buttons and with the same meaning: a "dash" indicates there are one or more unanswered questions in the indicated portion of the question hierarchy, a "check-mark" indicates all questions in the indicated portion of the hierarchy are answered and verified, and a "question-mark" indicates that all questions in the indicated portion of the hierarchy are answered but one or more remain unverified.

Figure 3:
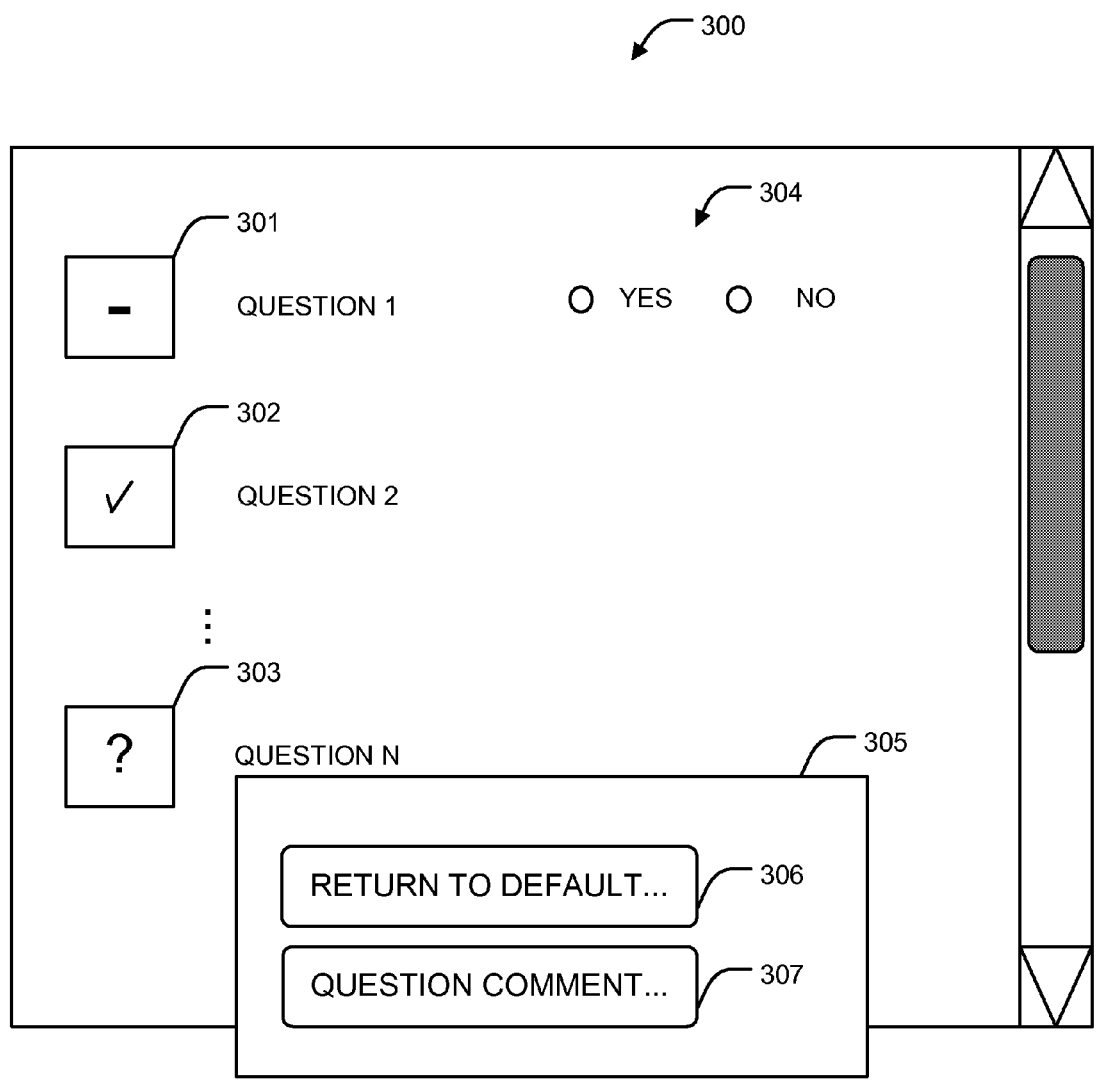
FIG. 3 illustrates a user interface, according to an example embodiment.

Turning to FIG. 3, a user interface is illustrated. The user interface 300 of FIG. 3 may be somewhat similar to interface 100. For example, indicator portions 301-303 may be similar to indicator portions 101-103. The indicator popup menu 305 may be initiated upon receipt of a user request. For example, a right-click or key combination may be input by a user. The popup menu 305 may then be initiated, providing one or more options for user selection. As illustrated, options 306 and 307 are provided. Options 306 and 307 are in no way exhaustive or limiting of example embodiments. Option 306 may provide for resetting the associated question answer to its default state. Option 307 may provide a popup dialog containing a field to enter text or comments related to a question.

Figure 4:
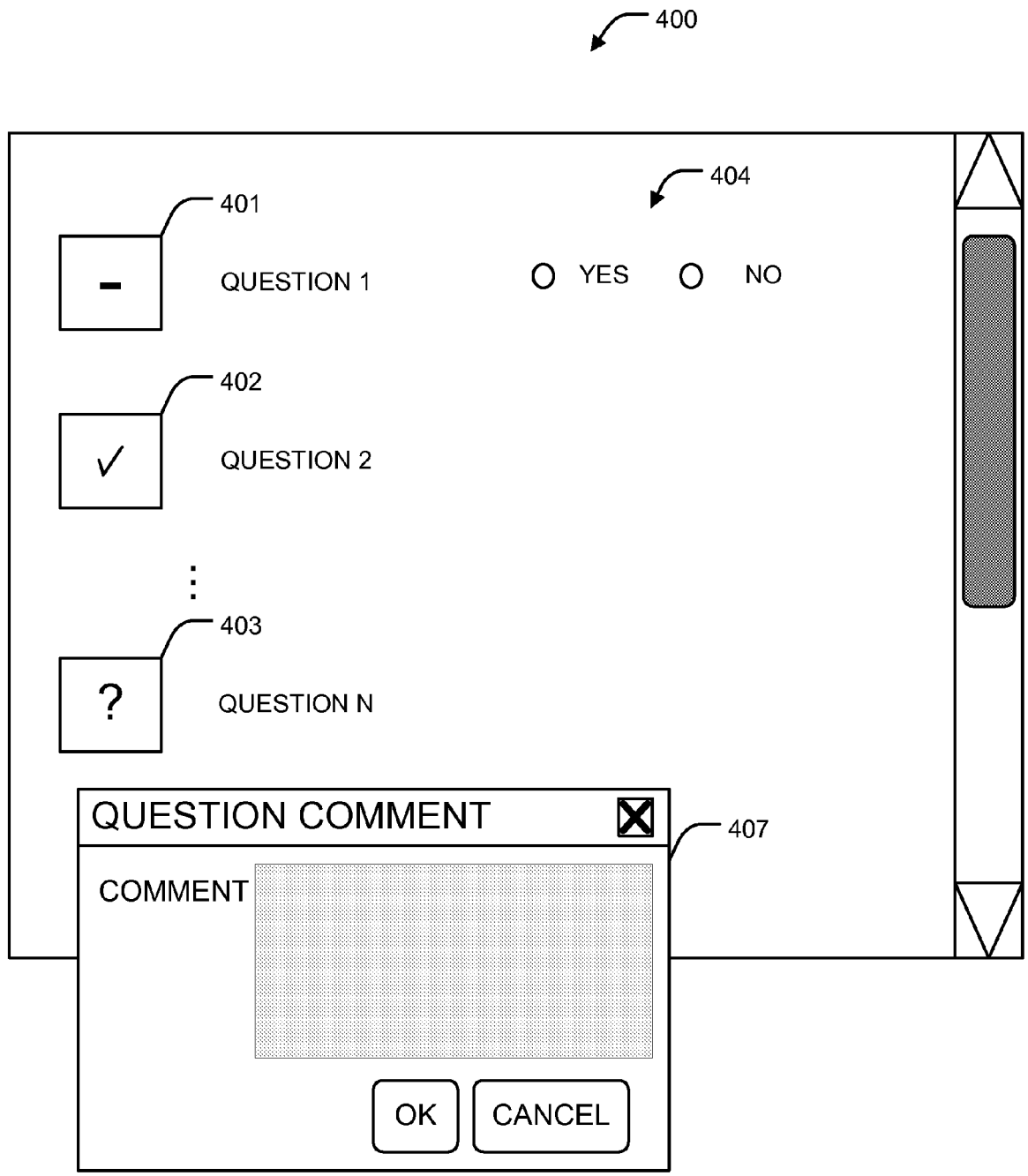
FIG. 4 illustrates a user interface, according to an example embodiment.

Turning to FIG. 4, a user interface including a comment dialog is illustrated. The user interface 400 may be substantially similar to interfaces 100 and 300 described above. Therefore, exhaustive description of similar details will be omitted herein for the sake of brevity. It is noted that a new dialog, the comment dialog 407, may be initiated upon selection of a "question comment" menu item from the indicator popup menu (see 307). The comment dialog may provide a textual interface allowing comments or other related information to be associated with a question. For example, text may be entered relating to contact information or people to contact regarding an appropriate answer to the related question, or background information for the answer.

Figure 5:
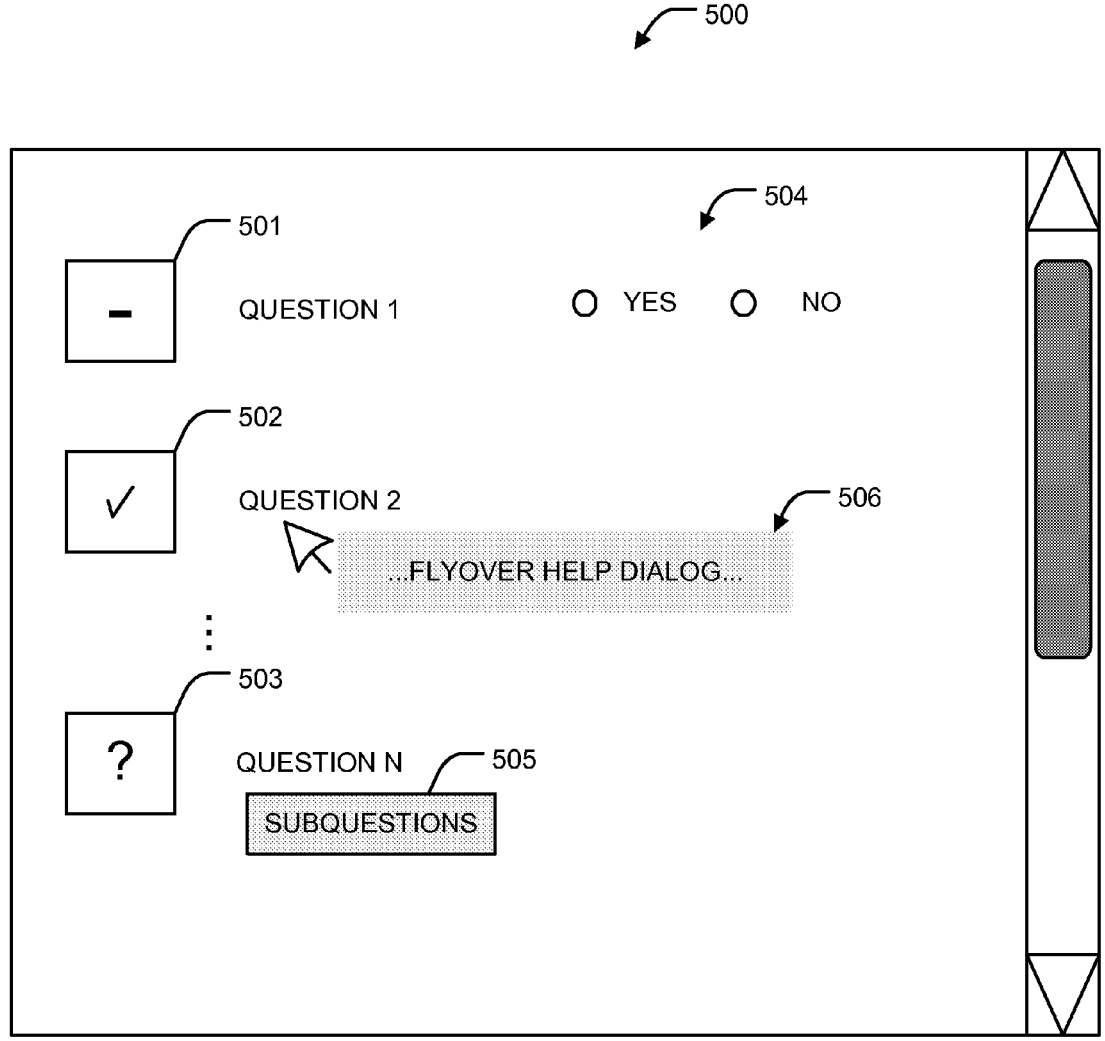
FIG. 5 illustrates a user interface, according to an example embodiment.

According to at least one example embodiment, additional textual information may be provided in addition to the non-textual indication of the user interface (100, 300, and 400). Turning to FIG. 5, a user interface 500 with textual indication 506 is illustrated. It is noted that interface 500 may be substantially similar to interfaces 100, 300 and 400, and therefore exhaustive detailed description of similar features will be omitted herein for the sake of brevity. The textual indication 506 may be in the form of a "flyover" window or a "flyover help" window. For example, a flyover window is a window which is displayed according to the location of a mouse pointer. According to at least one example embodiment, the flyover window 506 is initiated/displayed when a mouse or cursor of the user interface 500 is placed in relatively close proximity or over the non-textual indicator portions 501-503 of the interface 500. Therefore, the text of the flyover window may be further information, including clarifying the meaning of the question and instructions on how to obtain the answer to the question.

Figure 6:
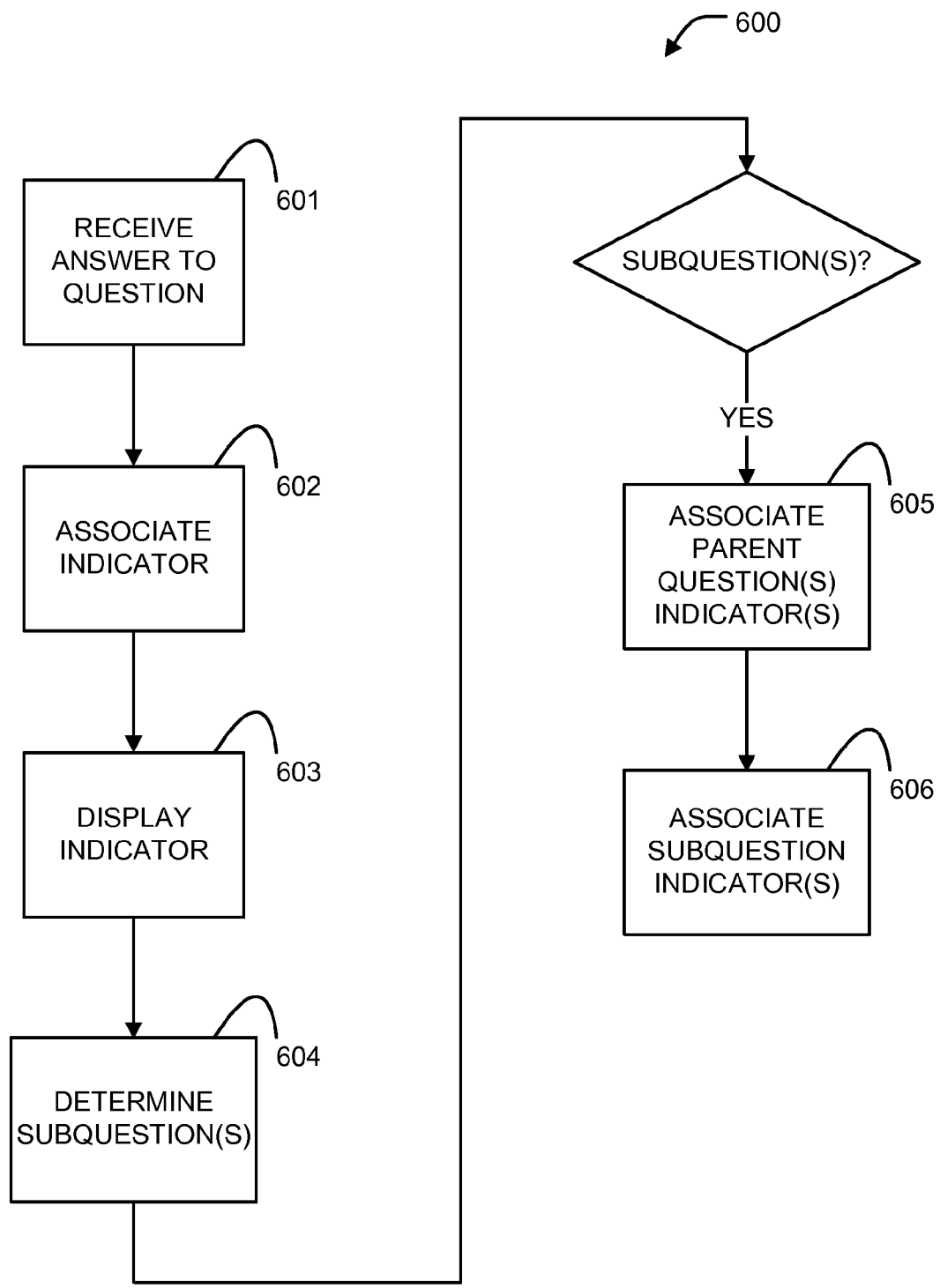
FIG. 6 illustrates a method, according to an example embodiment.

FIG. 6 illustrates a method of displaying non-textual indication of question verification status in a user interface, according to an example embodiment. It is noted that the user interface may include a plurality of questions associated there-with. The method includes receiving an answer to at least one question of the plurality of questions at block 601. For example, the answers may be null (i.e., unanswered or no value leaving the question unanswered), verified answers, or unverified answers. The method 600 further includes associating a non-textual indication of the verification status of the answer at block 602. Block 602 may include providing a visual selection aid to retrieve verification from a user of the user interface (e.g., selection buttons or toggle buttons).

Furthermore, block 602 may include associating a first, second, and third form of non-textual indication of a group of at least three forms of non-textual indication. The non-textual indication is the first form of non-textual indication if the answer is null, the non-textual indication is the second form of non-textual indication if the answer is a verified answer, and the non-textual indication is the third form of non-textual indication if the answer is not a verified answer. The at least three forms of non-textual indication may be colors, stripes or patterns, highlights, symbols (e.g., see FIG. 1), or any other suitable non-textual indication.

The method 600 further includes displaying the non-textual indication to the at least one question at block 603. The non-textual indication is displayed in a portion of the user interface being associated with the at least one question and the non-textual indication is the only non-textual indication associated with the at least one question. For example, with reference to at least FIG. 1, the non-textual indication portions are directly adjacent to the questions 1-N. Furthermore, all other indicators (e.g., flyover windows, comments dialogs, etc) are textual.

The method 600 further includes determining if a question Q is a subquestion at block 604.

If question Q is a subquestion, block 605 associates subquestion indicators of all question Q's parent questions $P_1$, $P_2$, $P_3$, .... For all of the parent questions, (e.g., $P_i$), the non-textual indication is the first form of non-textual indication if the answers to all the questions under $P_i$ in the hierarchy are unanswered, the non-textual indication is the second form of non-textual indication if the all the questions under $P_i$ in the hierarchy are answered and verified, and the non-textual indication is the third form of non-textual indication if all the questions under $P_i$ in the hierarchy are answered but one or more are unverified. The at least three forms of non-textual indication may be colors, stripes or patterns, highlights, symbols (e.g., see FIG. 1), or any other suitable non-textual indication.

If question Q is a subquestion, block 606 associates question Q's question category non-textual indicator. The non-textual indication is the first form of non-textual indication if the answers to all the questions under the question category in the hierarchy are unanswered, the non-textual indication is the second form of non-textual indication if the all the questions under the question category in the hierarchy are answered and verified, and the non-textual indication is the third form of non-textual indication if all the questions under the question category in the hierarchy are answered but one or more are unverified. The at least three forms of non-textual indication may be colors, stripes or patterns, highlights, symbols (e.g., see FIG. 1), or any other suitable non-textual indication.

Figure 7:
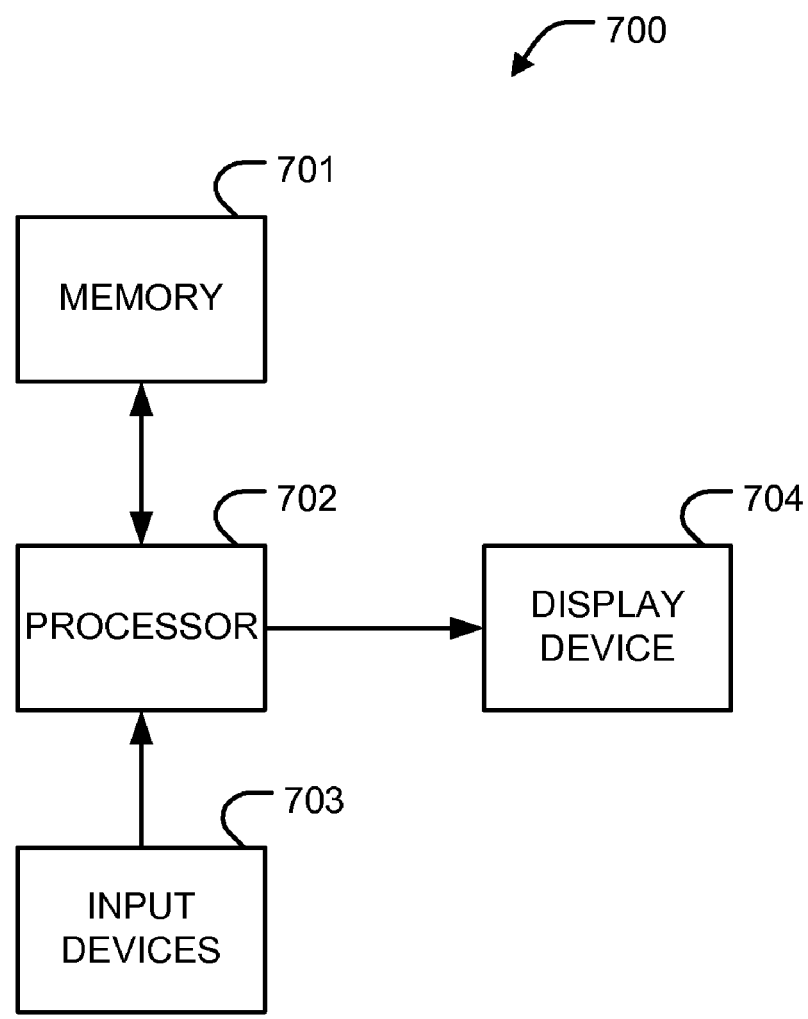
FIG. 7 illustrates a computer apparatus, according to an example embodiment.

Furthermore, according to an exemplary embodiment, the user interfaces described hereinbefore may be implemented by a computer system or apparatus. For example, FIG. 7 illustrates a computer apparatus, according to an exemplary embodiment. Therefore, portions or the entirety of the methodologies/interfaces described herein may be executed/created as instructions in a processor 702 of the computer system 700. The computer system 700 includes memory 701 for storage of instructions and information, input device(s) 703 for computer communication, and display device 704. Thus, the present invention may be implemented, in software, for example, as any suitable computer program on a computer system somewhat similar to computer system 700. For example, a program in accordance with the present invention may be a computer program product causing a computer to execute the example methods described herein, and/or create the user interfaces described herein.

The computer program product may include a computer-readable medium having computer program logic or code portions embodied thereon for enabling a processor (e.g., 702) of a computer apparatus (e.g., 700) to perform one or more functions in accordance with one or more of the example methodologies described above and/or create one or more of the features of the user interfaces described herein. The computer program logic may thus cause the processor to perform one or more of the example methodologies, or one or more functions/features of a given embodiment described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s)/interface(s) disclosed herein, in accordance with an exemplary embodiment of the present invention.

With only some example embodiments of the present invention having thus been described, it will be obvious that the same may be varied in many ways. The description of the invention hereinbefore uses these examples, including the best mode, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Such variations are not to be regarded as a departure from the spirit and scope of the present invention, and all such modifications are intended to be included within the scope of the present invention as stated in the following claims.

What is claimed is:

1. A method of displaying non-textual indication of question verification status in a user interface, the user interface including a plurality of questions associated there-with, the method comprising:

receiving an answer to at least one question of the plurality of questions;

associating a non-textual indication of the verification status of the answer with the at least one question, wherein, the associating includes interpreting a verification status of the answer, the interpreting including providing a visual selection aid to retrieve verification from a user of the user interface, the non-textual indication is a first form of non-textual indication if the answer is null, the non-textual indication is a second form of non-textual indication if the answer is a verified answer, and the non-textual indication is a third form of non-textual indication if the answer is not a verified answer;

displaying the non-textual indication of the at least one question, the non-textual indication being displayed in a portion of the user interface being associated with the at least one question associating a non-textual indication of composite subquestion answers for the at least one question, wherein, the associating includes interpreting a verification status of the composite subquestion answers, the interpreting including providing a visual selection aid to retrieve verification from a user of the user interface, the non-textual indication is a first form of non-textual indication if all answers of the composite subquestion answers are null, the non-textual indication is a second form of non-textual indication if all answers of the composite subquestion answers are answered but at least one subquestion is unverified, and the non-textual indication is a third form of non-textual indication if all answers of the composite subquestion answers are answered and verified; and displaying the non-textual indication of composite subquestion answers, the non-textual indication being displayed in a subquestion field associated with the at least one question.

2. The method of claim 1, wherein the visual selection aid is a user-changeable status indicator button and the status indicator button is a toggle button, wherein:

if the non-textual indicator indicates the verification status is answered and unverified, clicking the button changes the non-textual indicator to indicate the verification status is answered and verified.

3. The method of claim 1, wherein:

the first, second, and third forms of non-textual indication are one of symbols, colors, and patterns.

* * * * *